(12) United States Patent
Hashimoto et al.

(10) Patent No.: US 8,392,071 B2
(45) Date of Patent: Mar. 5, 2013

(54) OCCUPANT PROTECTION DEVICE

(75) Inventors: Syuzo Hashimoto, Toyota (JP); Mutsumu Haraoka, Toyota (JP)

(73) Assignee: Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 189 days.

(21) Appl. No.: 12/835,049

(22) Filed: Jul. 13, 2010

(65) Prior Publication Data
US 2010/0280718 A1 Nov. 4, 2010

Related U.S. Application Data

(63) Continuation of application No. PCT/JP2009/050224, filed on Jan. 9, 2009.

(30) Foreign Application Priority Data

Jan. 15, 2008 (JP) ................................. 2008-005682

(51) Int. Cl.
*B60N 2/42* (2006.01)
*B60R 21/01* (2006.01)

(52) U.S. Cl. ..... 701/45; 180/268; 280/801.2; 297/216.1
(58) Field of Classification Search .................... 701/45; 180/268; 280/801.1, 801.2; 297/216.1, 216.16
See application file for complete search history.

(56) References Cited

U.S. PATENT DOCUMENTS

| | | | |
|---|---|---|---|
| 6,463,372 B1 | 10/2002 | Yokota et al. | |
| 6,560,520 B2 | 5/2003 | Yokota et al. | |
| 6,574,540 B2 | 6/2003 | Yokota et al. | |
| 6,666,292 B2 | 12/2003 | Takagi et al. | |
| 7,031,814 B2 | 4/2006 | Kawato et al. | |
| 7,104,601 B2 * | 9/2006 | Masuda et al. | 297/216.1 |
| 7,200,474 B2 | 4/2007 | Motozawa et al. | |
| 8,157,045 B2 | 4/2012 | Hashimoto et al. | |
| 8,157,145 B2 * | 4/2012 | Shelton et al. | 227/175.1 |
| 8,190,333 B2 | 5/2012 | Hashimoto et al. | |
| 2002/0177934 A1 | 11/2002 | Yokota et al. | |
| 2002/0188393 A1 | 12/2002 | Yokota et al. | |
| 2003/0111287 A1 * | 6/2003 | Enomoto | 180/274 |
| 2004/0055806 A1 | 3/2004 | Ko et al. | |
| 2005/0131606 A1 * | 6/2005 | Motozawa et al. | 701/45 |
| 2005/0240329 A1 | 10/2005 | Hirota | |

(Continued)

FOREIGN PATENT DOCUMENTS

| | | |
|---|---|---|
| CN | 1741926 | 3/2006 |
| DE | 199 61 799 | 7/2001 |

(Continued)

OTHER PUBLICATIONS

International Search Report in International Application No. PCT/JP2009/050224, mailed Feb. 3, 2009.

(Continued)

*Primary Examiner* — Ruth Ilan
(74) *Attorney, Agent, or Firm* — Finnegan, Henderson, Farabow, Garrett & Dunner, L.L.P.

(57) ABSTRACT

An occupant protection device which causes less discomfort to an occupant after danger is avoided. When danger is detected (estimated collision time t is less than t1), a seat is adjusted to set the inclination angle of a seatback within a predetermined appropriate range. After that, when the danger is avoided, the inclination angle of the seatback is adjusted a predetermined amount so that the occupant is separated from a seat belt. This eliminates situations in which the tension of the seat belt is kept increased even after the danger is avoided, and as a result, discomfort to the occupant is suppressed.

8 Claims, 10 Drawing Sheets

U.S. PATENT DOCUMENTS

| | | | |
|---|---|---|---|
| 2005/0283292 A1 | 12/2005 | Kawato et al. | |
| 2007/0185635 A1* | 8/2007 | Mattes et al. | 701/45 |
| 2007/0194565 A1* | 8/2007 | Clute | 280/806 |
| 2007/0208474 A1* | 9/2007 | Bertele et al. | 701/45 |
| 2007/0294013 A1* | 12/2007 | Rieth et al. | 701/45 |
| 2008/0162002 A1* | 7/2008 | Bacher et al. | 701/45 |
| 2008/0290644 A1* | 11/2008 | Spahn et al. | 280/806 |
| 2010/0280718 A1* | 11/2010 | Hashimoto et al. | 701/45 |
| 2011/0098893 A1* | 4/2011 | Hashimoto | 701/46 |
| 2012/0032482 A1 | 2/2012 | Hashimoto et al. | |

FOREIGN PATENT DOCUMENTS

| | | |
|---|---|---|
| DE | 101 21 386 | 8/2002 |
| DE | 103 25 163 | 12/2004 |
| DE | 103 18 417 | 1/2005 |
| EP | 1 591 308 A1 | 11/2005 |
| JP | 5-8678 | 1/1993 |
| JP | 11-334437 | 12/1999 |
| JP | 2001-322532 | 11/2001 |
| JP | 2002-211352 | 7/2002 |
| JP | 2003-165406 | 6/2003 |
| JP | 2005-145179 | 6/2005 |
| JP | 2005-238934 | 9/2005 |
| JP | 2005-271889 | 10/2005 |
| JP | 2005-306340 | 11/2005 |
| JP | 2006-82703 | 3/2006 |
| JP | 2007-106355 | 4/2007 |
| JP | 2007-261327 | 10/2007 |
| JP | 2007-296944 | 11/2007 |
| RU | 94003903 | 10/1995 |
| WO | WO 01/45985 A1 | 6/2001 |
| WO | WO 2006/134417 A1 | 12/2006 |

OTHER PUBLICATIONS

Written Reply in International Application No. PCT/JP2009/050224, responsive to Notice of Feb. 3, 2009.

German Office Action for German Appl. No. 11 2009 000 109.2-21 dated Mar. 15, 2011.

The First Office Action for CN Appl. No. 200980102156.8 dated Sep. 22, 2011.

Decision on Grant Patent for Invention for Russian Appl. No. 2010133941 dated Jul. 15, 2011.

International Search Report in International Application No. PCT/IB2009/005880; Mailing Date: Jun. 1, 2010.

Written Opinion of the International Searching Authority in International Application No. PCT/IB2009/005880; Mailing Date: Jun. 1, 2010.

Notification of Reason(s) for Refusal in JP 2008-150380; Drafting Date: Apr. 27, 2010.

* cited by examiner

OCCUPANT PROTECTION DEVICE

CROSS-REFERENCE TO RELATED APPLICATIONS

This application is a continuation application of International Application No. PCT/JP2009/050224, filed Jan. 9, 2009, and claims the priority of Japanese Application No. 2008-005682, filed Jan. 15, 2009, the contents of both of which are incorporated herein by reference.

TECHNICAL FIELD

The present invention relates to an occupant protection device and, in particular, relates to an occupant protection device that protects a vehicle occupant when a dangerous situation is predicted in the vicinity of the vehicle.

BACKGROUND ART

Various techniques have been proposed for occupant protection devices that detect danger to a vehicle and protect a vehicle occupant, such as the technique described in Japanese Patent Application Laid-Open (JP-A) No. 2005-271889.

In the technique described in JP-A No. 2005-271889, it is proposed that a collision prediction determination is made based on the distance between a subject vehicle and a vehicle following to the rear, and when the distance measured is equal to or less than a predetermined value and it is predicted that a collision will occur after a predetermined time, and when the angle of the seatback is not equal to or greater than a predetermined value, the angle of inclination thereof is raised to a predetermined value and, in addition, the front edge of the seat cushion is lowered and, after the collision, the front edge of the seat cushion is raised.

However, in the technique described in JP-A No. 2005-271889, while the vehicle occupant is appropriately restrained by a seatbelt in preparation for a collision, there is a possibility that a high degree of restraint will be maintained when the dangerous situation is avoided, causing discomfort to the vehicle occupant. Accordingly, there is room for improvement of this technique.

DISCLOSURE OF THE INVENTION

A first aspect provides an occupant protection device that is provided with a determination unit that determines whether or not a vehicle is in a dangerous situation based on a detection result from a detection unit that detects dangerous situations in the vicinity of the vehicle, a displacement unit that displaces the relative positional relationship between a seatbelt restraining a vehicle occupant and the vehicle occupant, and a control unit that controls the displacement unit so as to separate the vehicle occupant from the seatbelt when, after it is determined by the determination unit that the vehicle is in a dangerous situation, it is determined by the determination unit that the dangerous situation has been avoided.

BRIEF DESCRIPTION OF THE DRAWINGS

As shown in FIG. 1, occupant protection device 10 according to the exemplary embodiment of the present invention is provided with front millimeter-wave radar 12 for detecting the distance to an obstacle in front, forward sides millimeter-wave radar 14 for detecting the distance to an obstacle at the forward sides, stereo camera 16 that captures images toward the front, rear millimeter-wave radar 13 for detecting the distance to an obstacle behind, rearward sides millimeter-wave radar 15 for detecting the distance to an obstacle at the rearward sides, rear camera 17 that captures images toward the rear, collision determination ECU 18 that predicts a collision, and seat control ECU 22 that controls the state of the seat when a collision is predicted, each of which are connected by bus 20.

Figure 1:
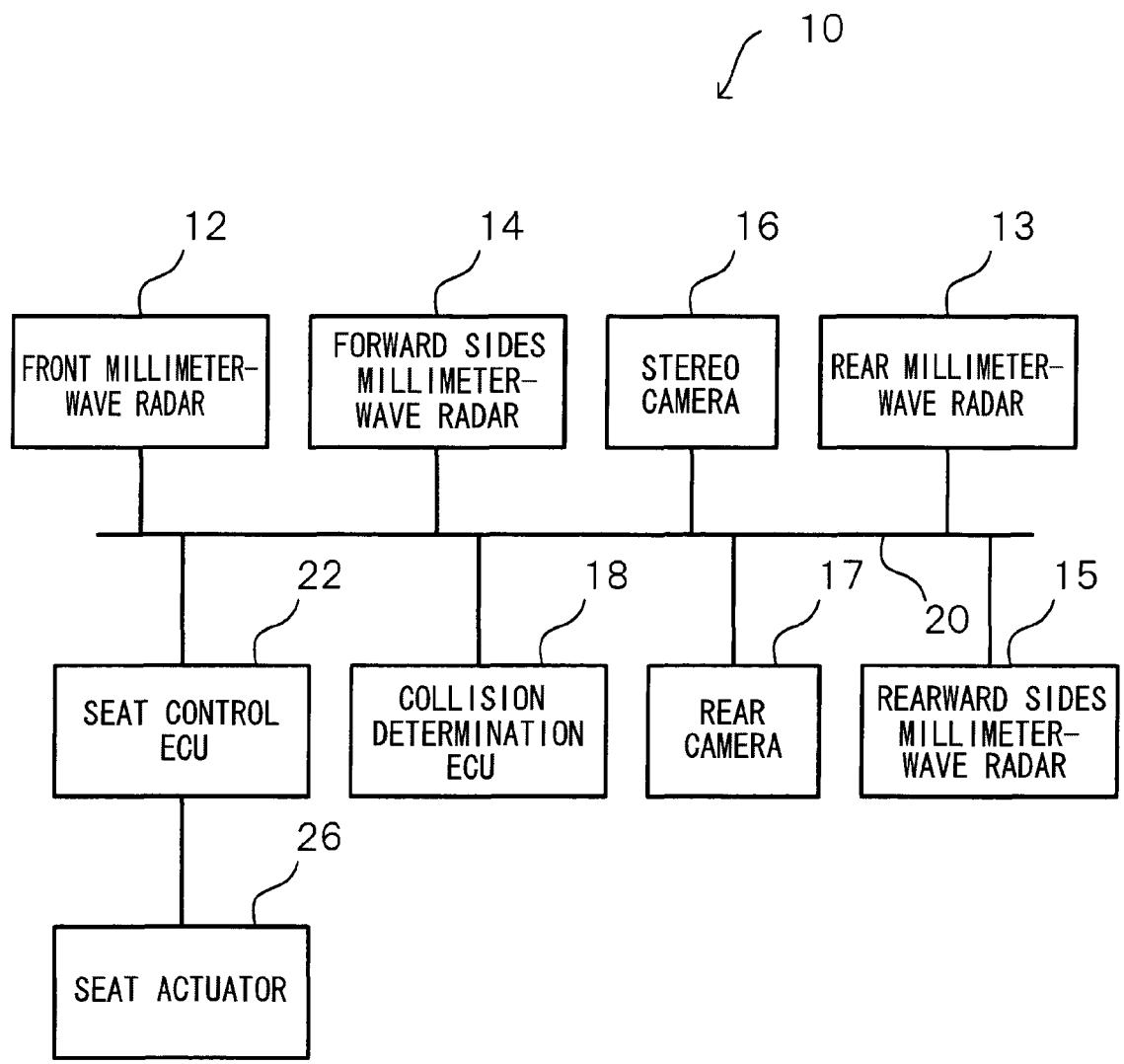
FIG. 1 is a block diagram showing the configuration of an occupant protection device according to an exemplary embodiment of the present invention.

Front millimeter-wave radar 12, forward sides millimeter-wave radar 14, stereo camera 16, rear millimeter-wave radar 13, rearward sides millimeter-wave radar 15 and rear camera 17 monitor the vicinity of the vehicle and output the surveillance results to collision determination ECU 18.

Front millimeter-wave radar 12 is provided, for example, in a central portion of the front grill, and forward sides millimeter-wave radar 14 is provided inside the bumper in the vicinity of each end thereof in a vehicle width direction. Front millimeter-wave radar 12 and forward sides millimeter-wave radar 14 are provided in order to respectively emit millimeter waves to the front and to the forward sides of the vehicle, receive radio waves reflected back from a target object, and measure the distance to the target object, the relative velocity thereof relative to the subject vehicle and the like based on, for example, the transmission time or the frequency difference generated by the Doppler effect. Further, rear millimeter-wave radar 13 and rearward sides millimeter-wave radar 15 are provided in the rear bumper or the like. Rear millimeter-wave radar 13 and rearward sides millimeter-wave radar 15 are provided in order to respectively emit millimeter waves to the rear and to the rearward sides of the vehicle, receive radio waves reflected back from a target object, and measure the distance to the target object, the relative velocity thereof relative to the subject vehicle and the like based on, for example, the transmission time or the frequency difference generated by the Doppler effect.

Stereo camera 16 is provided, for example, in the vehicle interior at a central location at the top of the front windshield glass. Stereo camera 16 is provided to capture images forward of the vehicle and detect surrounding obstacles, and also to measure the distance to an obstacle. Rear camera 17 is provided, for example, in the vehicle interior at a central location at the top of the rear windshield glass. Rear camera 17 is provided to capture images rearward of the vehicle and detect surrounding obstacles, and also to measure the distance to an obstacle. Further, stereo camera 16 and rear camera 17 may be omitted from the configuration of the invention because the distance to an obstacle can be measured by front millimeter-wave radar 12, forward sides millimeter-wave radar 14, rear millimeter-wave radar 13, rearward sides millimeter-wave radar 15, or the like.

Collision determination ECU 18 acquires detection results from front millimeter-wave radar 12, forward sides millimeter-wave radar 14, stereo camera 16, rear millimeter-wave radar 13, rearward sides millimeter-wave radar 15, and rear camera 17 and performs collision prediction. Collision prediction can be performed by applying various known technologies and detailed explanation thereof is, therefore, omitted.

Figure 2:
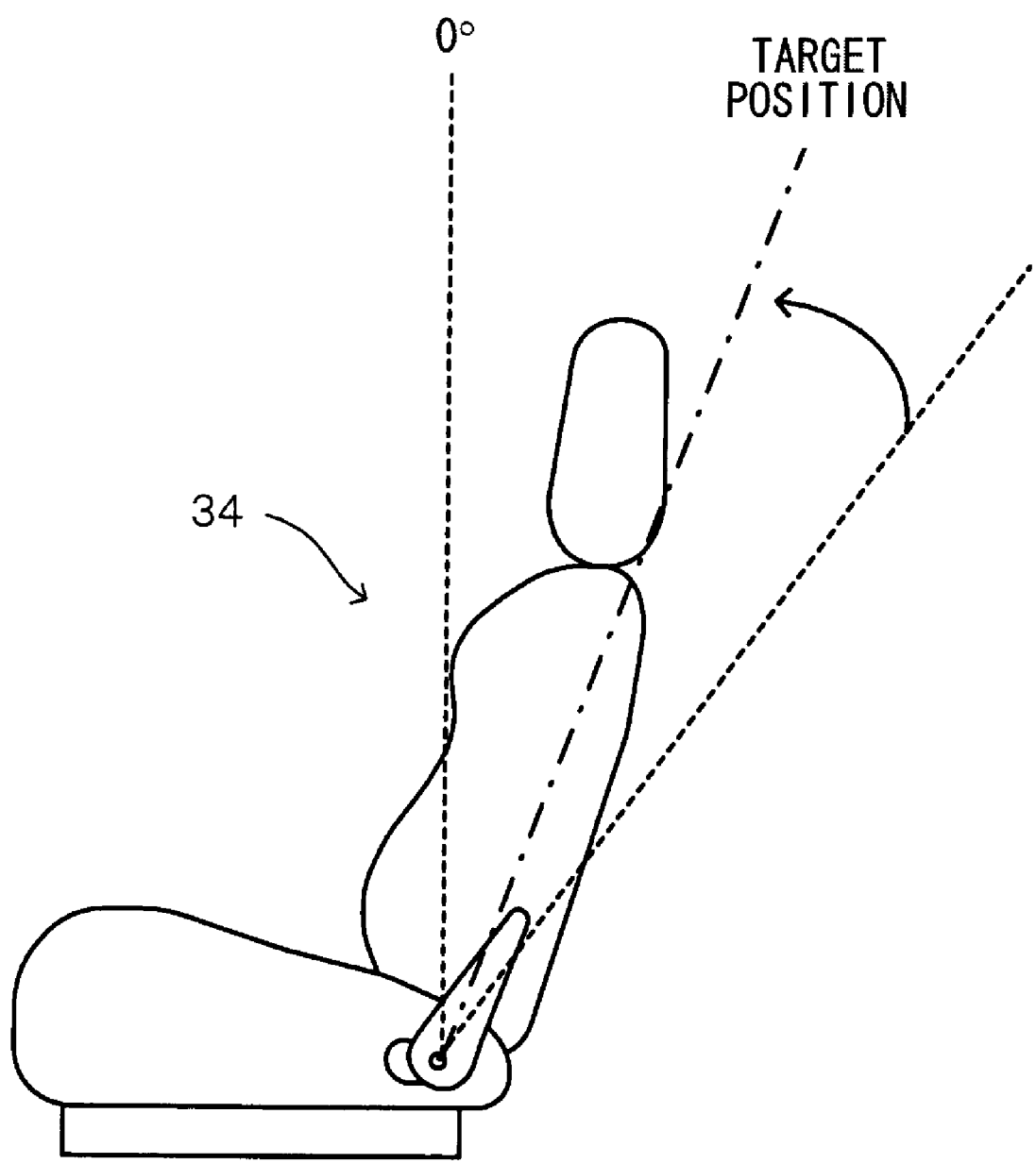
FIG. 2 is a drawing for explaining an example of seat adjustment (reclining adjustment).

Further, seat control ECU 22 is connected to seat actuator 26, which is for adjusting various states of the seat. When a collision is predicted by collision determination ECU 18, seat control ECU 22 controls the operation of seat actuator 26, adjusts the seat reclining mechanism and the seat sliding mechanism, and adjusts the state of the seat to a predetermined appropriate state (appropriate range) prior to the collision. In the present embodiment, as shown in FIG. 2, the angle of inclination of the seatback of seat 34 is adjusted such that the seatback is reclined at a predetermined target position (target range).

Further, when a change in the state of seat 34 is directed by a switch or the like (not shown), seat control ECU 22 operates seat actuator 26 in accordance with the state of operation of the switch and changes the state of the seat in terms of seat slide or reclining or the like.

Incidentally, in occupant protection device 10 according to the present embodiment, collision determination ECU 18 acquires the respective results of monitoring of the surroundings from front millimeter-wave radar 12, forward sides millimeter-wave radar 14, stereo camera 16, rear millimeter-wave radar 13, rearward sides millimeter-wave radar 15, and rear camera 17 and performs collision prediction, and the collision prediction consists, for example, of determining relative velocity from changes in the distance to an object and calculating the time until collision. Then, when the calculated estimated collision time t is less than a predetermined time, this is taken as detection of danger. Further, in the present embodiment, when danger is detected, the state of the seat is adjusted to an appropriate state (appropriate range). More specifically, in terms of seat adjustment, the angle of inclination of the seatback is adjusted by driving the actuator such that the angle of inclination of the seatback, that is, the angle of inclination of reclining, is adjusted to an appropriate range (target range), and restraint by the seatbelt is appropriately performed at the time of collision.

However, if, after danger is detected by collision determination ECU 18, the danger is avoided, because the tension of the seatbelt has been increased by the adjustment of the seat state and that state is maintained by the restraint of the seatbelt, the vehicle occupant is made to suffer discomfort. Therefore, in the present embodiment, after danger is avoided, the positions of the seatbelt and the vehicle occupant are displaced relative to each other in a direction that increases the distance between the seatbelt and the vehicle occupant. More specifically, in the present embodiment, the positions of the seatbelt and the vehicle occupant are displaced relative to each other by adjusting the angle of the seatback in a direction such that the seatback is lowered (falls down) to a given angle. As a result, the restraining state of the seatbelt is alleviated after avoiding danger, and discomfort to the vehicle occupant can be reduced.

Next, the processing in the respective ECUs in occupant protection device 10 according to an embodiment of the present invention configured as described above is explained in detail.

Figure 3:
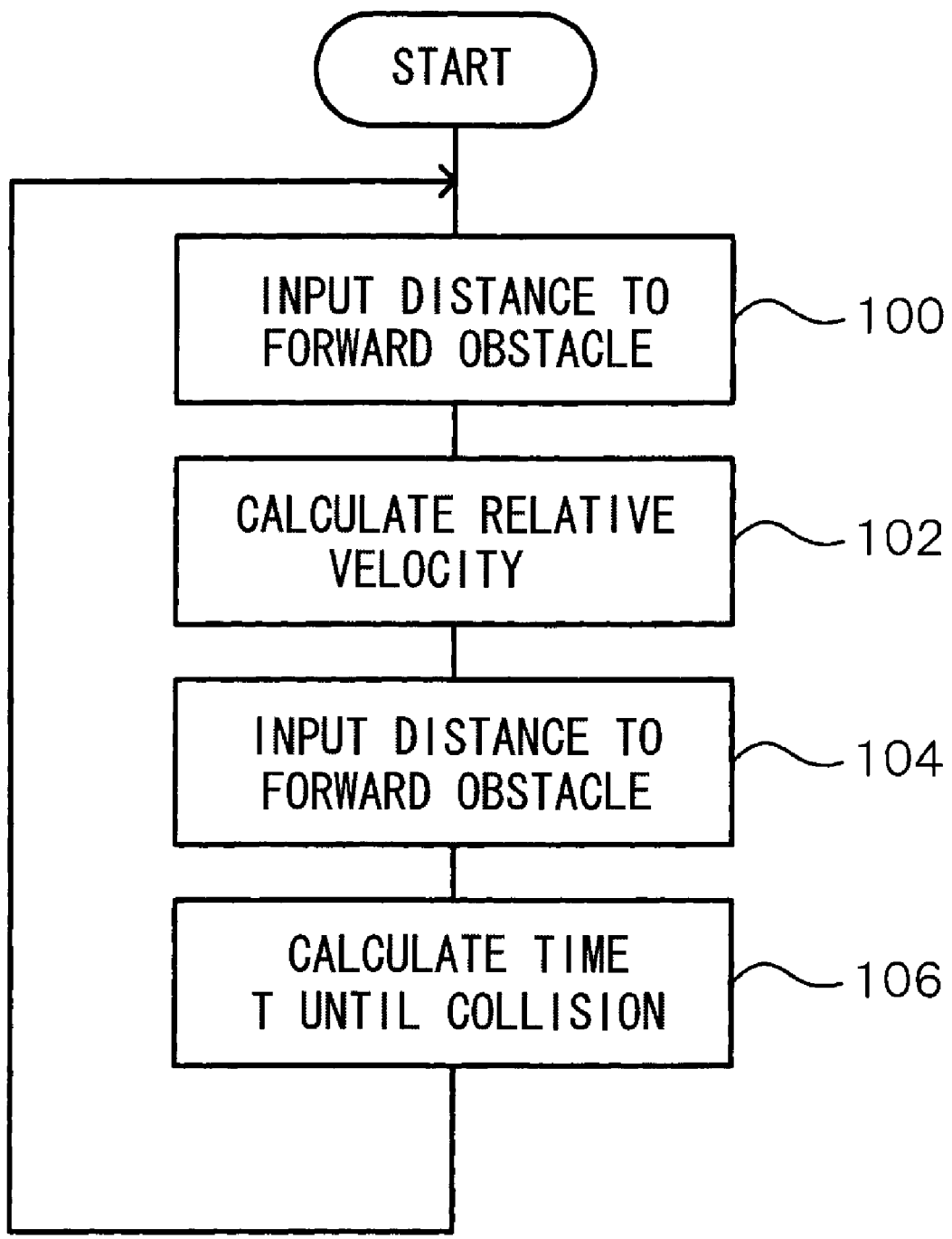
FIG. 3 is a flowchart showing an example of the flow of processing performed at the collision determination ECU of an occupant protection device according to an exemplary embodiment of the present invention.

First, processing performed at collision determination ECU 18 is explained. FIG. 3 is a flowchart showing an example of the flow of processing performed at collision determination ECU 18 of occupant protection device 10 according to an embodiment of the present invention. Further, the processing of FIG. 3 is explained in terms of commencing when an ignition switch (not shown) is switched on and terminating when the ignition switch is turned off or when a collision occurs.

In step 100, the distance to a forward obstacle is input and then the processing proceeds to step 102. That is, the detection results from front millimeter-wave radar 12, forward sides millimeter-wave radar 14, stereo camera 16 and the like are input.

In step 102, relative velocity is calculated and then the processing proceeds to step 104. For example, relative velocity is calculated from the distance to a forward obstacle detected at regular intervals by a millimeter-wave radar (front millimeter-wave radar 12, forward sides millimeter-wave radar 14 or the like).

In step 104, detection results from the millimeter-wave radar are input again and then the processing proceeds to step 106.

In step 106, time t until collision is calculated and then the processing returns to step 100 and the processing described above is repeated. That is, time t until collision is calculated from the distance to the forward obstacle detected by front millimeter-wave radar 12, forward sides millimeter-wave radar 14, stereo camera 16, and the like and from the relative velocity calculated in step 102, whereupon the processing returns to step 100 and the above-described processing is repeated.

Figure 4:
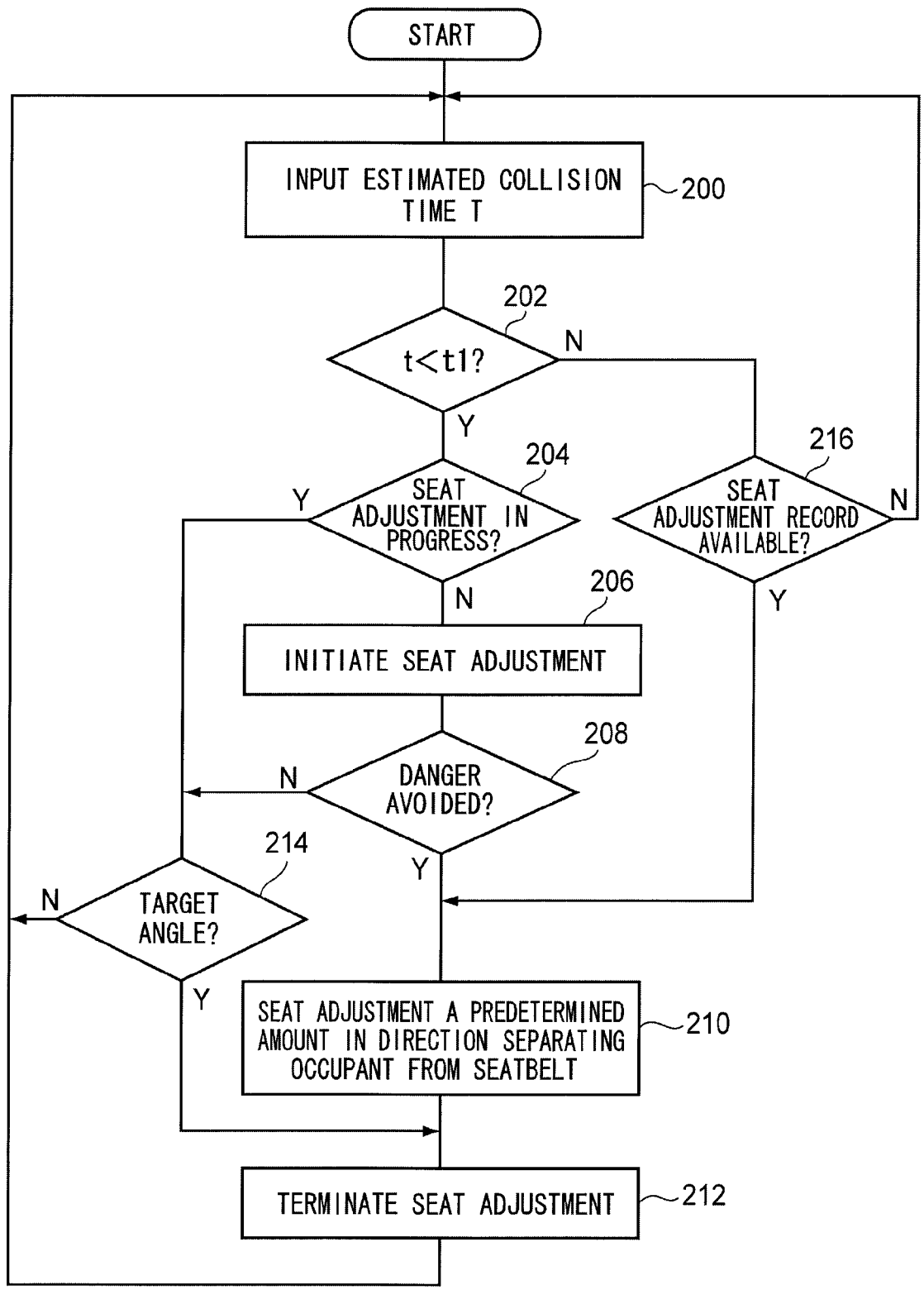
FIG. 4 is a flowchart showing an example of the flow of processing performed at the seat control ECU of an occupant protection device according to an exemplary embodiment of the present invention.

Next, the processing performed at seat control ECU 22 is explained. FIG. 4 is a flowchart showing an example of the flow of processing performed at seat control ECU 22 of occupant protection device 10 according to an embodiment of the present invention. Further, the processing of FIG. 4 is explained in terms of commencing when an ignition switch (not shown) is switched on and terminating when the ignition switch is turned off or when a collision occurs.

In step 200, estimated collision time t calculated by collision determination ECU 18 is input and then the processing proceeds to step 202.

In step 202, a determination is made as to whether or not estimated collision time t is less than a predetermined time t1, and when the determination is affirmative the processing proceeds to step 204 and when the determination is negative the processing proceeds to step 216.

In step 204, a determination is made as to whether or not the seat is in the process of being adjusted. This determination assesses whether or not seat actuator 26 is operating due to a collision time of less than t1 having already been reached, and when the determination is negative the processing proceeds to step 206 and when the determination is affirmative the processing proceeds to step 214.

In step 206, seat adjustment is initiated by initiating operation of seat actuator 26, and then the processing proceeds to step 208. That is, the angle of inclination of the seatback is adjusted such that it reaches a predetermined target angle (target range).

In step 208, a determination is made as to whether or not danger has been avoided. In the determination, the estimated collision time t is input again from collision determination ECU 18, it is determined whether or not the input estimated collision time t is a longer time than the previous estimated collision time, and it is determined whether or not the obstacle is no longer present and the estimated collision time has been cleared, and the like. When the determination is affirmative, the processing proceeds to step 210 and when the determination is negative, the processing proceeds to step 214.

In step 210, a predetermined amount of seat adjustment is performed in a direction that moves the vehicle occupant away from the seatbelt and then the processing proceeds to step 212. That is, in the present embodiment, the seatback is adjusted by a certain angle in a direction of lowering the seatbelt. As a result, when danger has been avoided, the state of restraint by the seatbelt is alleviated, whereby discomfort to the vehicle occupant is reduced by ensuring that the seatbelt is not maintained at high tension.

Then, in step 212, adjustment of the seat is terminated and then the processing returns to step 200 and the above-described processing is repeated.

Further, when the determination in step 204 is affirmative, that is, when estimated collision time t is less than t1, danger has been detected and adjustment of the seat has already been initiated, the processing proceeds to step 214. In step 214, a determination is made as to whether or not the target angle, that is, the seatback angle, is in the predetermined target range. When the determination is negative, the processing returns to step 200 and the above-described processing is repeated, and when affirmative, the processing proceeds to step 212. In step 212, seat adjustment is terminated. Further, the determination regarding attainment of the target angle may be determined from the drive amount of seat actuator 26, by providing a sensor that detects the reclining angle and detecting the angle from the detection value of the sensor, or by providing a limit switch at an appropriate predetermined angle and determining whether or not the switch is turned on.

Further, when the determination in step 202 is negative, that is, when estimated collision time t is equal to or greater than t1, the processing proceeds to step 216. In step 216, a determination is made as to whether or not any record of seat adjustment exists. This determination determines, after detection of danger, affirmative determinations in steps 204 and 214 and completion of seat adjustment to the target angle, whether or not the seatback is being maintained at the target angle. When the determination is negative, the processing returns to step 200 and the above-described processing is repeated, and when affirmative, the processing proceeds to step 210. That is, when, after danger is detected, the seat has already been adjusted to the target angle and is maintained in this state, and then danger is avoided, a predetermined amount of seat adjustment is performed that moves the vehicle occupant away from the seatbelt, whereby the restraining state of the seatbelt is alleviated, such that the seatbelt is not maintained at high tension and, as a result, discomfort to the vehicle occupant can be reduced.

Figure 5:
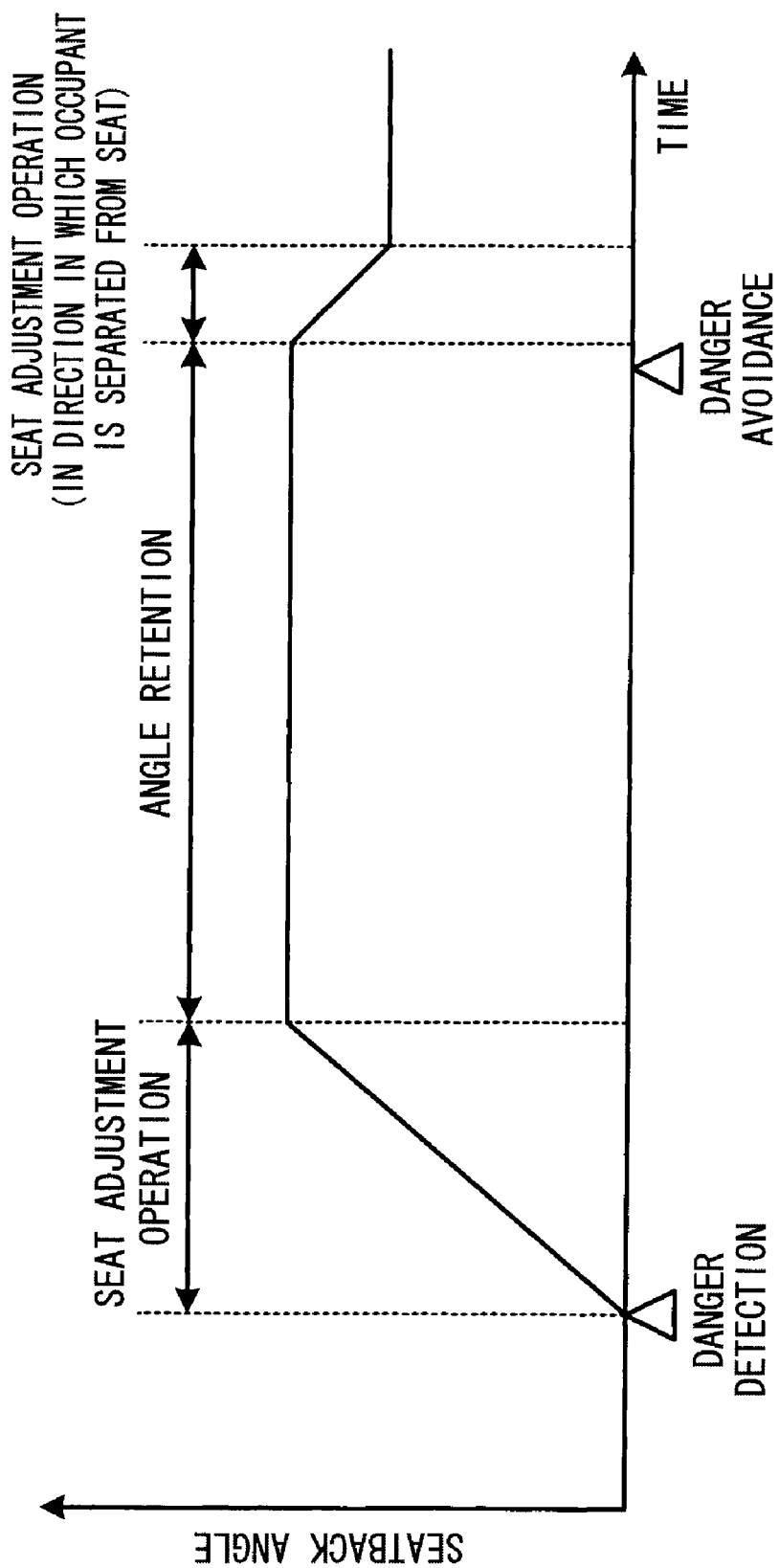
FIG. 5 is a drawing for explaining seat adjustment by an occupant protection device according to an exemplary embodiment of the present invention.

By performing this kind of processing at collision determination ECU 18 and seat control ECU 22, as shown in FIG. 5, seat adjustment is performed at the point at which danger is detected (the point at which estimated collision time t becomes less than t1) and the angle is maintained at the point at which it becomes the target angle. Thereafter, when danger has been avoided, because the seat is adjusted in a direction that moves the vehicle occupant away from the seatbelt, the restraining state of the seatbelt is alleviated, a state in which the seatbelt is maintained at high tension is not continued after danger has been avoided, and discomfort to the vehicle occupant can be reduced.

Figure 6A:
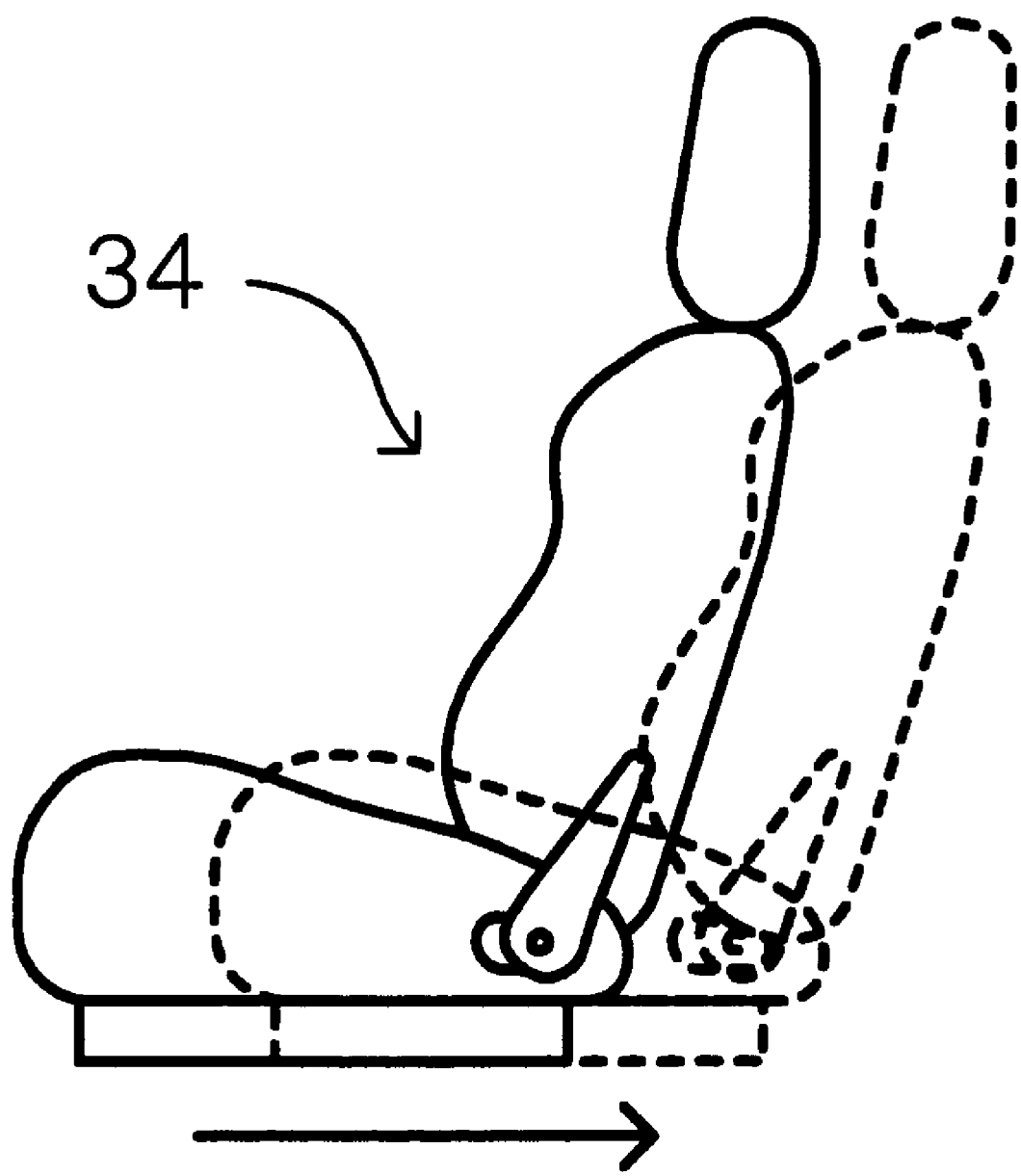
FIG. 6A is a drawing showing a first example of another configuration of seat adjustment in a direction that moves the vehicle occupant away from the seatbelt.
Figure 6B:
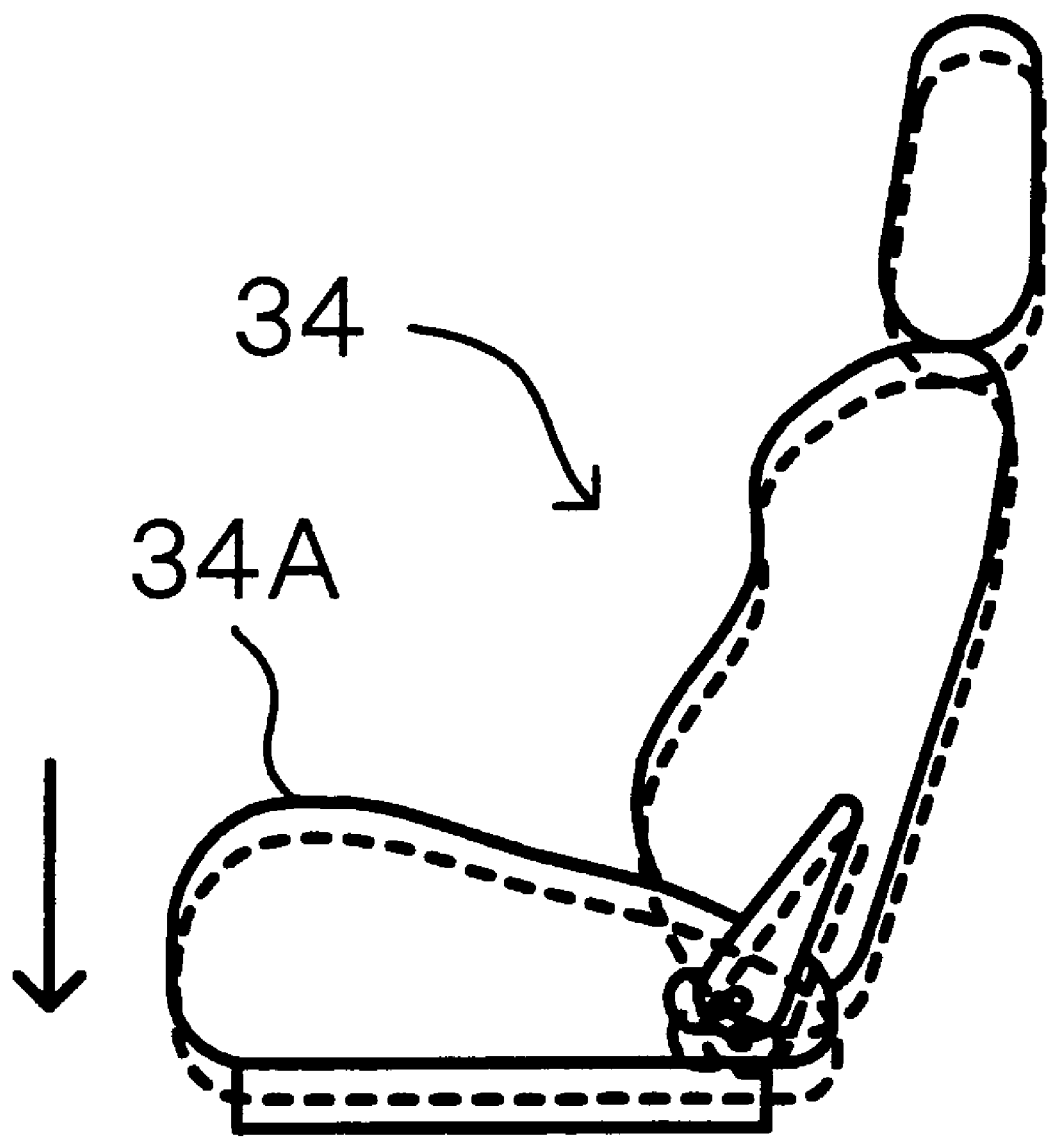
FIG. 6B is a drawing showing a second example of another configuration of seat adjustment in a direction that moves the vehicle occupant away from the seatbelt.
Figure 6C:
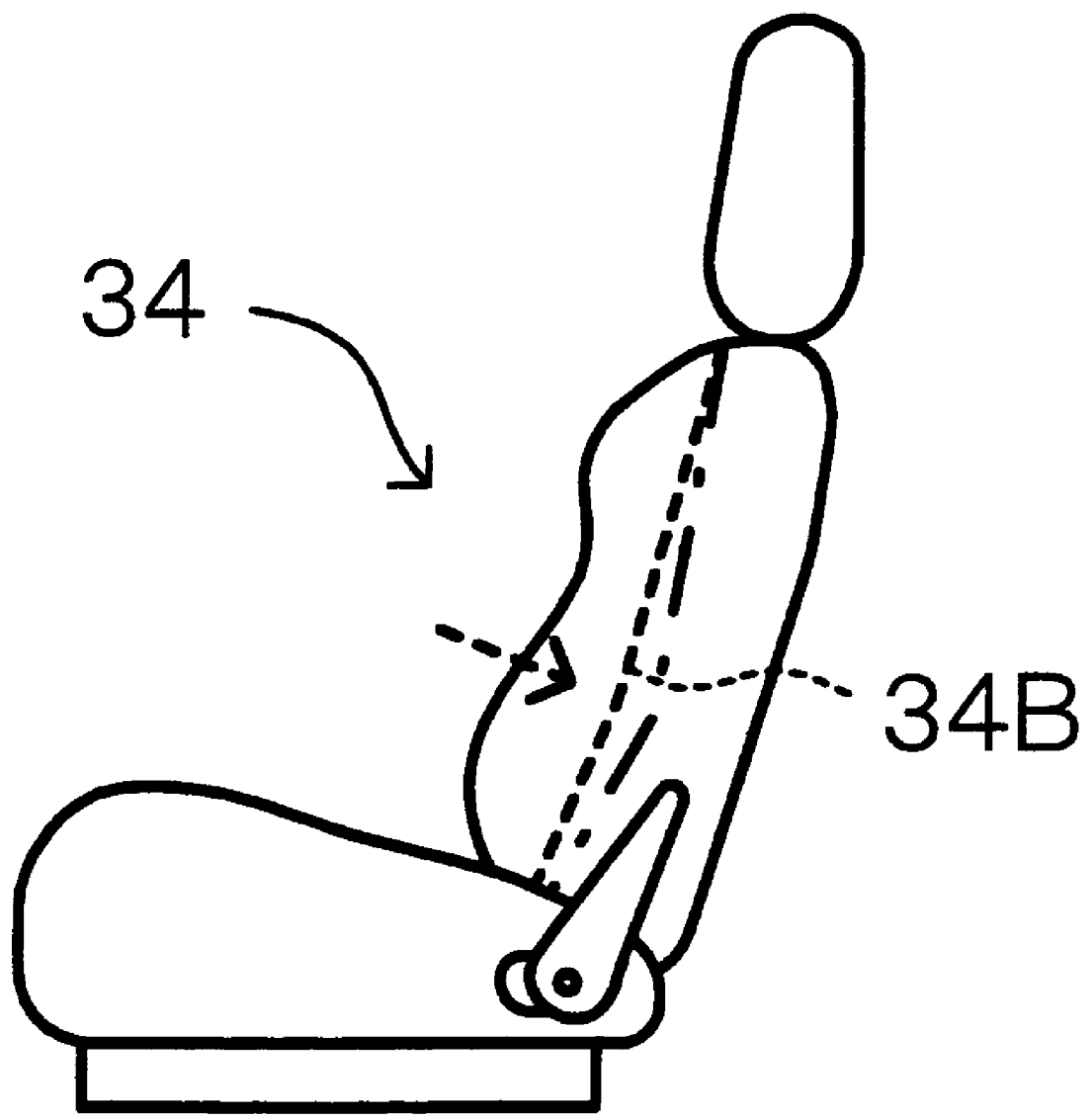
FIG. 6C is a drawing showing a third example of another configuration of seat adjustment in a direction that moves the vehicle occupant away from the seatbelt.
Figure 6D:
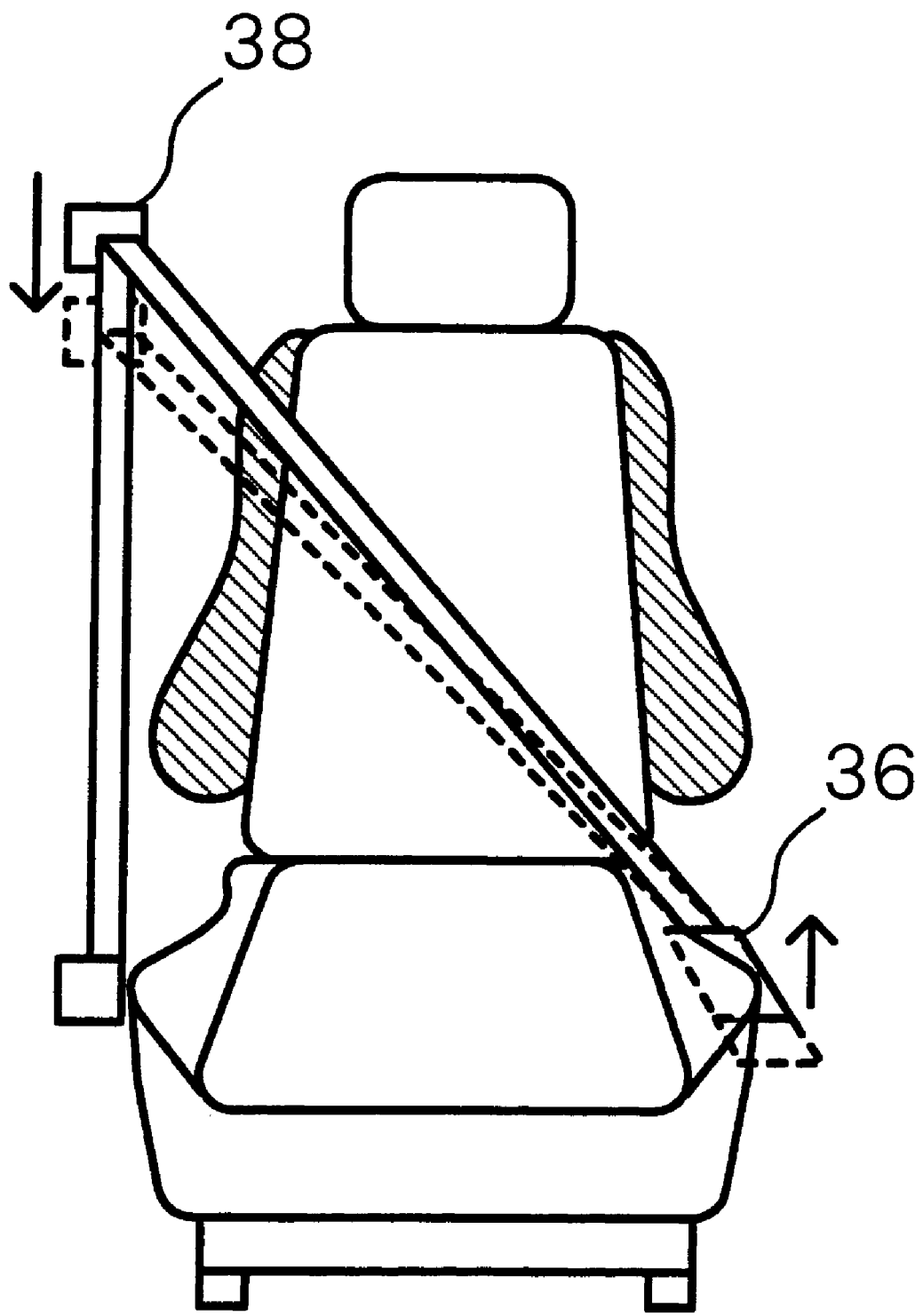
FIG. 6D is a drawing showing a fourth example of another configuration of belt anchor adjustment in a direction that moves the seatbelt away from the vehicle occupant.

In the embodiment described above, seat adjustment is performed when danger has been detected and, when danger has been avoided, seat adjustment (adjustment of the reclining inclination angle) is performed in a direction that moves the vehicle occupant away from the seatbelt. However, examples of configurations for adjustment in a direction that moves the vehicle occupant away from the seatbelt are not limited to adjustment of the seat reclining inclination angle. For example, as shown in FIG. 6A, an actuator for sliding seat 34 in a front-back direction relative to the vehicle may be provided and the seat slid backwards. Alternatively, as shown in FIG. 6B, an actuator for moving seat 34 or seat cushion 34A in a perpendicular direction relative to the floor surface of the vehicle may be provided and seat 34 or seat cushion 34A moved downward. Alternatively, as shown in FIG. 6C, an actuator for adjusting seatback lumbar portion 34B corresponding to the lumbar region of the vehicle occupant may be provided and the seat adjusted in a direction such that seatback lumbar portion 34B collapses rearward (adjustment of the portion of the seatback corresponding to the lumbar region of the vehicle occupant). Alternatively, as shown in FIG. 6D, an actuator for moving seatbelt anchor 36 in a perpendicular direction relative to the floor surface of the vehicle may be provided and seatbelt anchor 36 moved upward. Alternatively, as shown in FIG. 6D, an actuator for moving shoulder belt anchor 38 at the seatbelt pillar portion in a vertical direction relative to the vehicle may be provided and shoulder belt anchor 38 moved downward. Further, the respective seat adjustments and seatbelt anchor adjustments may be appropriately combined.

Figure 6E:
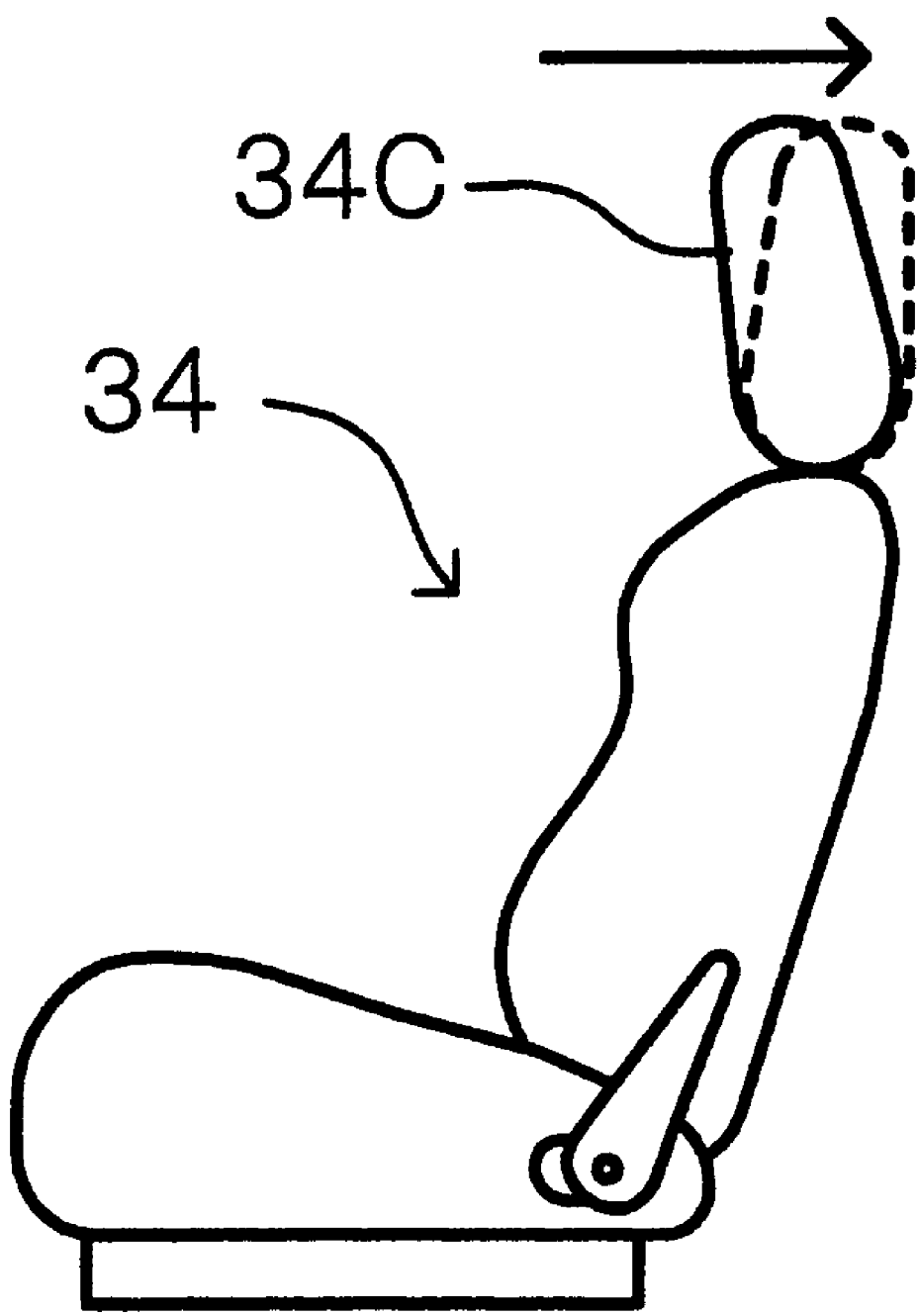
FIG. 6E is a drawing showing an example of a case in which restraint of the vehicle occupant is released. Preferred Embodiments for Practicing the Invention In the following, an exemplary embodiment of the present invention is explained in detail with reference to the drawings.

Further, in the embodiment described above, seat adjustment is performed when danger has been detected and, when danger has been avoided, seat adjustment (adjustment of the reclining inclination angle) is performed in a direction that moves the vehicle occupant away from the seatbelt. However, when danger has been avoided, the restraining state of the vehicle occupant may be alleviated. For example, as shown in FIG. 6E, when headrest 34C of seat 34 is moved forward when danger is detected, the restraining state of the vehicle occupant may be alleviated when danger has been avoided by moving headrest 34C backward. In addition, an actuator for adjusting the tension of the seatbelt may be provided and the restraining state of the vehicle occupant alleviated by reducing the tension of the seatbelt, thereby reducing discomfort to the vehicle occupant.

Further, in the embodiment described above, explanation has been made using the example of an occupant protection device that performs seat adjustment when danger is detected, but the embodiment is not limited thereto. For example, when danger is detected, restraint of the vehicle occupant by the seatbelt is generally performed as a result of the vehicle occupant operating the brakes or the like. As a result, in an occupant protection device that does not perform seat adjustment when danger is detected, too, the state of restraint by the seatbelt is maintained even after danger is avoided, causing discomfort to the vehicle occupant. Here, the positions of the seatbelt and the vehicle occupant may be moved relative to each other after danger has been avoided in order to move the vehicle occupant away from the seatbelt. In this way, restraint by the seatbelt is not maintained after danger has been avoided and discomfort to the vehicle occupant can be reduced.

In addition, in the embodiment described above, danger is detected at both front and rear; however, the embodiment is not limited thereto. For example, detection may be made in only one of the directions. That is, front millimeter-wave radar 12, forward sides millimeter-wave radar 14, and stereo camera 16, or rear millimeter-wave radar 13, rearward sides millimeter-wave radar 15, and rear camera 17 may be provided, and danger detected either to the front or to the rear.

The invention claimed is:

1. An occupant protection device comprising:
   a determination unit that determines whether or not a vehicle is in a dangerous situation based on a detection result from a detection unit that detects dangerous situations in a vicinity of the vehicle;
   a displacement unit that displaces the relative positional relationship between a seatbelt that restrains a vehicle occupant and the vehicle occupant; and
   a control unit that controls the displacement unit so as to separate the vehicle occupant from the seatbelt when, after it is determined by the determination unit that the vehicle is in a dangerous situation, it is determined by the determination unit that the dangerous situation has been avoided;
   wherein the displacement unit includes at least one of:
      a seat adjustment unit that adjusts a seat state by adjusting a seatback angle of inclination or a position of the seatback corresponding to a lumbar region of the vehicle occupant; or
      a seatbelt adjustment unit that adjusts a seatbelt position in a vertical direction relative to a vehicle floor by adjusting vertical position of a shoulder belt anchor relative to the vehicle floor, the shoulder belt anchor being located closer to a headrest of a seat than a seat cushion of the seat.

2. The occupant protection device of claim 1, wherein the control unit further controls the displacement unit such that the positional relationship is set to a predetermined appropriate range when it is determined by the determination unit that the vehicle is in a dangerous situation.

3. The occupant protection device of claim 1, wherein the seat adjustment unit adjusts at least one of the seat states of a seat slide position in a vehicle front-rear direction, or a vertical position of the seat or a seat cushion relative to the vehicle floor.

4. The occupant protection device of claim 1, wherein the seatbelt adjustment unit adjusts vertical position of a seatbelt anchor relative to the vehicle floor.

5. An occupant protection device comprising:
   a determination unit that determines whether or not a vehicle is in a dangerous situation based on a detection result from a detection unit that detects dangerous situations in a vicinity of the vehicle;
   an adjustment unit that adjusts a restraining state of a vehicle occupant; and
   a control unit that controls the adjustment unit so as to alleviate the restraining state when, after it is determined by the determination unit that the vehicle is in a dangerous situation, it is determined by the determination unit that the dangerous situation has been avoided;
   wherein the adjustment unit includes at least one of:
      a seat adjustment unit that adjusts a seat state by adjusting a seatback angle of inclination or a position of the seatback corresponding to a lumbar region of the vehicle occupant; or
      a seatbelt adjustment unit that adjusts a seatbelt position in a vertical direction relative to a vehicle floor by adjusting vertical position of a shoulder belt anchor relative to the vehicle floor, the shoulder belt anchor being located closer to a headrest of a seat than a seat cushion of the seat.

6. The occupant protection device of claim 5, wherein the control unit further controls the adjustment unit so as to restrain the vehicle occupant when it is determined by the determination unit that the vehicle is in a dangerous situation.

7. The occupant protection device of claim 5, wherein the seat adjustment unit adjusts at least one of the seat states of a seat slide position in a vehicle front-rear direction, or a vertical position of the seat or a seat cushion relative to the vehicle floor.

8. The occupant protection device of claim 5, wherein the seatbelt adjustment unit adjusts a vertical position of a seatbelt anchor relative to the vehicle floor.

* * * * *